United States Patent
Arnold et al.

(10) Patent No.: US 7,889,097 B1
(45) Date of Patent: Feb. 15, 2011

(54) DETECTING TARGETS IN ROADWAY INTERSECTIONS

(75) Inventors: David V. Arnold, Provo, UT (US); Bryan R. Jarrett, Orem, UT (US); Dale M. Jarvis, Orem, UT (US); Thomas W. Karlinsey, Orem, UT (US); Ryan L. Smith, Salem, UT (US); Jonathan L. Waite, Orem, UT (US)

(73) Assignee: Wavetronix LLC, Lindon, UT (US)

( * ) Notice: Subject to any disclaimer, the term of this patent is extended or adjusted under 35 U.S.C. 154(b) by 673 days.

(21) Appl. No.: 11/614,250

(22) Filed: Dec. 21, 2006

Related U.S. Application Data (63) Continuation of application No. 11/311,103, filed on Dec. 19, 2005, now abandoned.

(51) Int. Cl.
 *G08G 1/095* (2006.01)
(52) U.S. Cl. .................................. 340/907; 340/933
(58) Field of Classification Search ............... 340/907, 340/916, 917, 933, 941–943; 343/700 MS
 See application file for complete search history.

(56) References Cited

U.S. PATENT DOCUMENTS

| | | | |
|---|---|---|---|
| 4,167,330 A | 9/1979 | Haville | |
| 4,908,615 A | 3/1990 | Bayraktaroglu | |
| 5,339,081 A | 8/1994 | Jefferis et al. | |
| 5,663,720 A | 9/1997 | Weissman | |
| 5,721,194 A * | 2/1998 | Yandrofski et al. | 505/210 |
| 5,793,491 A | 8/1998 | Wangler et al. | |
| 5,798,983 A | 8/1998 | Kuhn et al. | |
| 5,926,114 A | 7/1999 | Andrews | |
| 6,037,894 A | 3/2000 | Pfizenmaier et al. | |
| 6,114,973 A | 9/2000 | Winner et al. | |
| 6,118,405 A * | 9/2000 | Mckinnon et al. | 343/700 MS |
| 6,124,807 A | 9/2000 | Heckeroth et al. | |
| 6,490,519 B1 | 12/2002 | Lapidot et al. | |

(Continued)

FOREIGN PATENT DOCUMENTS

GB     1443701     7/1976

OTHER PUBLICATIONS

U.S. Appl. No. 10/754,217, filed Jan. 8, 2004, Arnold et al.

(Continued)

*Primary Examiner*—Jeffery Hofsass
(74) *Attorney, Agent, or Firm*—Workman Nydegger (57) ABSTRACT

The present invention extends to detecting targets in roadway intersections. A traffic sensor includes a transducer system and a transceiver system. The transducer system creates a plurality of transducer views for detecting targets located in a portion of the intersection. The transducer system includes a transducer configured to transmit signals towards and to receive signals and signal reflections within a portion of the two or more approaches to the intersection. The transducer is configured such that when necessary the transducer can transmit a signal and receive a signal or signal reflection simultaneously. The transceiver system is configured to generate digital data indicative of the transducer receiving a signal or signal reflection. The transducer system and transceiver system interoperate to generate an aggregate sensor view of the intersection that includes a plurality of transducer views of the two or more approaches to the intersection.

28 Claims, 5 Drawing Sheets

U.S. PATENT DOCUMENTS

| | | | |
|---|---|---|---|
| 6,556,916 | B2 | 4/2003 | Waite et al. |
| 6,693,557 | B2 | 2/2004 | Arnold et al. |
| 6,781,523 | B2 | 8/2004 | Matsui et al. |
| 6,888,474 | B2 | 5/2005 | Sharp et al. |
| 7,089,422 | B2 | 8/2006 | Huntingdon et al. |
| 7,317,406 | B2 | 1/2008 | Wolterman |
| 7,327,280 | B2 | 2/2008 | Bachelder et al. |
| 7,408,479 | B2 | 8/2008 | Johnson |
| 7,421,334 | B2 | 9/2008 | Dahlgren et al. |
| 7,426,450 | B2 | 9/2008 | Arnold et al. |
| 7,427,930 | B2 | 9/2008 | Arnold et al. |
| 7,501,976 | B2 | 3/2009 | Manor |
| 7,573,400 | B2 | 8/2009 | Arnold et al. |
| 2005/0046597 | A1 | 3/2005 | Hutchinson et al. |
| 2005/0231384 | A1 | 10/2005 | Shimotani |
| 2005/0242306 | A1 | 11/2005 | Sirota et al. |
| 2006/0287807 | A1 | 12/2006 | Teffer |
| 2007/0096943 | A1 | 5/2007 | Arnold et al. |
| 2007/0152869 | A1 | 7/2007 | Woodington et al. |
| 2007/0208495 | A1 | 9/2007 | Chapman et al. |

OTHER PUBLICATIONS

U.S. Appl. No. 10/603,608, filed Jun. 26, 2003, Huntingdon et al.
SmarTek Acoustic Sensor—Version 1 (SAS-1) Installation and Setup Guide; Apr. 3, 2003.
University Research in Support of the Department of Transportation Program on Remote Sensing Applications in Transportation (DTRS56-00-BAA-0004) Nov. 1999.
Cambridge Consultants; Technology at the crossroads: new radar sensor allows pedestrians and traffic to coexist; Feb. 24, 2004.
Transportation Systems Railway Grade Crossing Sensor Aug. 17, 2004 1 pg.
Transportation Systems Millimeter Wave Radar Traffic Sensor AutoTrak Aug. 17, 2004 2 pgs.
Image Sensor for Measuring Volumes by Direction Atsushi Saito International Sales & Marketing Department Social Systems Solution & Service Business Company OMRON Corporation, Tokyo Japan ITS World Congress Oct. 2004 1 pg.
Computer Vision Algorithms for Intersection Monitoring; Harini Veeraraghavan, Osama Masoud, and Nikolaos P. Papanikolopoulous, Senior Member, IEEE IEEE Transactions on Intelligent Transportation Systems, vol. 4, No. 2, Jun. 2003.
Red Light Hold Radar-based system prevents collisions from red light runners Optisoft The Intelligent Traffic Signal Platform 2 pgs.
Transportation Sensors Optional features for the OptiSoft ITS Platform Optisoft The Intelligent Traffic Signal Platform 1 pg.
U.S. Appl. No. 11/311,103, filed Dec. 19, 2005, Arnold et al.
U.S. Appl. No. 12/546,219, filed Aug. 24, 2009, Arnold et al.
U.S. Appl. No. 12/546,196, filed Aug. 24, 2009, Arnold et al.
UMRR: A 24GHz Medium Range Radar Platform, Smart Microwave Sensors GmbH, Jul. 25, 2003.
The UMRR 24GHz Radar Sensor Family for Short and Medium Range Applications, Smart Microwave Sensors GmbH, Apr. 8, 2004.
A 24 GHz ACC Radar Sensor, Smart Microwave Sensors GmbH, Feb. 28, 2005.
Klotz et al., "An Automotive Short Range High Resolution Pulse Radar Network," Jan. 2002.
U.S. Appl. No. 60/439,109, filed Jan. 10, 2003, Arnold et al.
U.S. Appl. No. 60/785,964, filed Mar. 24, 2006, Giles et al.
U.S. Appl. No. 11/689,441, filed Mar. 21, 2007, Giles et al.
U.S. Appl. No. 61/185,005, filed Jun. 8, 2009, Arnold et al.
U.S. Appl. No. 12/502,965, filed Jul. 14, 2009, Arnold et al.
U.S. Appl. No. 12/710,736, filed Feb. 23, 2010, Arnold et al.
International Search Report and Written Opinion from PCT/US2010/037602 dated Aug. 6, 2010.
Office Action dated Jan. 8, 2010 from U.S. Appl. No. 11/689,441.
International Search Report and Written Opinion from PCT/US2007/064711, dated Sep. 4, 2008.
International Search Report for PCT/US2010/037596 dated Aug. 19, 2010.
Examination Report from Canadian Patent Application No. 2512689, dated Sep. 30, 2010.

* cited by examiner

DETECTING TARGETS IN ROADWAY INTERSECTIONS

CROSS-REFERENCE TO RELATED APPLICATIONS

This application is a continuation of U.S. utility patent application Ser. No. 11/311,103 filed on Dec. 19, 2005, now abandoned entitled DETECTING TARGETS IN ROADWAY INTERSECTIONS, which is incorporated herein in its entirety.

BACKGROUND OF THE INVENTION

1. The Field of the Invention

The present invention relates to detecting targets in roadway intersections.

2. The Relevant Technology

The use of traffic sensors for the actuation of traffic signal lights located at the intersection of roadways is quite common. Generally, such traffic sensors can provide input used to properly actuate traffic control devices in response to the detection or lack of detection of vehicles. For example, traffic sensors can enable a traffic control device to skip unnecessary signal phases, such as, for example, skipping a left hand turn phase when no vehicles are detected in a corresponding left hand turn lane. Traffic sensors can also enable a traffic signal to increase green light duration for major arterials by only signaling the green light in the minor cross streets when vehicles are detected on the minor cross streets and thus minimizing the red light for a major arterial. Thus, traffic sensors assist in properly actuating a signalized intersection to improve traffic flow. In addition to the actuation of signalized intersections of roadways for automobile traffic, traffic sensors are also used for the actuation of intersections of a roadway for automobile traffic with a railway.

Unfortunately, the cost of traffic sensors and cost of corresponding installation can be relatively high. Thus, traffic sensors and related costs can become a significant expenditure for municipalities. The high installation costs arise at least in part from the need to install sensors for every approach to an intersection.

Typically, traffic signal lights have been actuated using inductive loop detectors embedded in the roadway. Inductive loop detectors are very expensive to install since lane closures are necessary. The high cost is compounded, especially for multi-lane roadways, since at least one inductive loop detector is required for each detection zone (e.g., left hand turn lane detection zones, through lane detection zones, and right hand turn lane detection zones). Furthermore, inductive loop detector technology is often unreliable and inductive loop detectors require a great deal of calibration.

Video detectors are also used in some traffic signal actuation systems. To facilitate traffic signal light actuation, a video camera is placed high above a signal arm such that the video camera's view covers one approach to the intersection. The video signal from the camera is digitally processed to create detections in the defined zones. Using video detectors an intersection can be monitored on a per approach basis (that is all the lanes of an approach), as opposed to the per detection zone basis used with inductive loops. However, at least one camera per approach is required. Since a dedicated mounting arm is often necessary and at least one camera per approach is required, the installation of a video detector system can also be expensive and time consuming.

Microwave detectors have also been used in intersections to provide detection coverage over limited areas. At least one microwave detector has a limited degree of mechanical and electrical steering. However, similar to video detectors, one microwave detector per approach is required and the coverage is typically over a small portion of the intersection. Further, manual configuration is needed to ensure that the proper detection zones from each sensor are wired to the proper input in the traffic controller.

Other microwave sensors have included multiple receive antennas but have included only a single transmit antenna that has a very broad main beam or even may be an omni-directional antenna. Systems that employ only one broad beam or omni-directional transmit antenna typically cannot achieve an appropriately reduced side lobe power level. Furthermore, these single transmit antenna systems typically suffer from widening of the mainlobe.

Acoustic sensors have also been used in intersections to cover limited detection zones. However, these sensors also require one unit per approach. Therefore intersection traffic detection products that reduce the number of sensors and sensor installations required would be advantageous.

BRIEF SUMMARY OF THE INVENTION

The foregoing problems with the prior state of the art are overcome by the principles of the present invention, which are directed towards methods, systems, and computer program products for detecting targets in roadway intersections. A traffic sensor includes a transducer system and a transceiver system.

The transducer system creates a plurality of transducer views of the roadway intersection. Each transducer view can detect targets located in a portion of the roadway intersection. The transducer system includes a transducer configured to transmit signals towards a portion of two or more approaches to the roadway intersection and configured to receive signals and signal reflections within the portions of the two or more approaches to the roadway intersection.

The transceiver system is configured to generate digital data indicative of the transducer receiving a signal or signal reflection. The transducer system and transceiver system interoperate to generate an aggregate sensor view of the roadway intersection. The aggregate sensor view includes a plurality of transducer views of the two or more approaches to the roadway intersection. In some embodiments, the traffic sensor is configured to have an aggregate sensor view of approximately 270 degrees. In other embodiments, the traffic sensor is configured to have an aggregate view of approximately 90 degrees. In these other embodiments, multiple collocated sensors can be used together to provide larger aggregate views.

These and other objects and features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION OF THE PREFERRED EMBODIMENTS

The principles of the present invention provide for detecting targets in roadway intersections. A traffic sensor includes a transducer system and a transceiver system.

The transducer system creates a plurality of transducer views of the roadway intersection. Each transducer view can detect targets located in a portion of the roadway intersection. The transducer system includes a transducer configured to transmit signals towards a portion of two or more approaches to the roadway intersection and configured to receive signals and signal reflections within the portions of the two or more approaches to the roadway intersection.

The transceiver system is configured to generate digital data indicative of the transducer receiving a signal or signal reflection. The transducer system and transceiver system interoperate to generate an aggregate sensor view of the roadway intersection. The aggregate sensor view includes a plurality of transducer views of the two or more approaches to the roadway intersection. In some embodiments, the traffic sensor is configured to have an aggregate sensor view of approximately 270 degrees. In other embodiments, the traffic sensor is configured to have an aggregate view of approximately 90 degrees. In these other embodiments, multiple collocated sensors can be used together to provide larger aggregate views.

In this specification and in the following claims the word "transducer" means a device for converting signals that propagate through the air (e.g., radar signals, electromagnetic signals, acoustic signals, laser signals, infrared signals, etc.) into electronic signals in a traffic sensor, the word "transducer" can also mean a device for converting electronic signals in a traffic sensor into signals that propagate through the air. For example, a microwave antenna is a transducer.

In this specification and in the following claims, the term "intersection of roadways" is defined as the intersection of two or more roadways for automobile and/or truck traffic including the approaches to the intersection. In this specification and in the following claims, the term "roadway intersection" is defined to include an intersection of roadways and also to include an intersection of roadways with one or more thoroughfares for other traffic, including the approaches to the intersection. Thoroughfares for other traffic may include pedestrian paths and railways.

Figure 1:
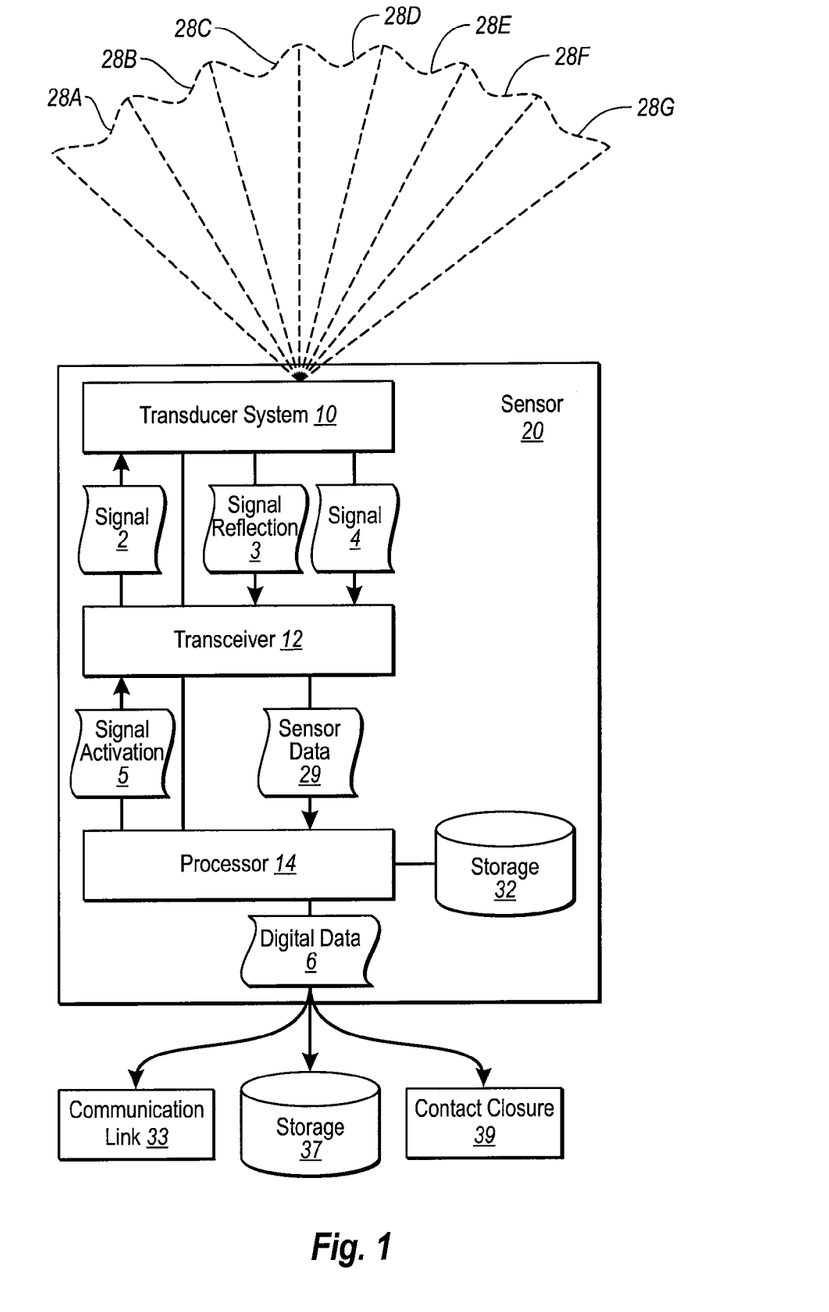
FIG. 1 illustrates one embodiment of an intersection traffic sensor.

FIG. 1 is an example intersection traffic sensor 20. Generally, intersection traffic sensor 20 can be used to detect objects (e.g., vehicles, pedestrians, etc.) at a roadway intersection. As depicted, traffic sensor 20 includes transducer system 10, transceiver 12, processor 14, and storage 32.

Transceiver 12 is configured to generate signals (e.g., signal 2) and receive back corresponding signal reflections (e.g., signal reflection 3) that result from generated signals reflecting off of an object, such as, for example, a vehicle. Transceiver 12 is also configured to receive signals (including any of previously described types of signals) from other sensors (e.g., signal 4). A generated transmit signal can include a Frequency Modulated Continuous Wave ("FMCW") radar signal that is generated via direct digital synthesis and frequency multiplication. A generated transmit signal can also include one or more of a microwave transmit signal, an acoustic transmit signal, a laser transmit signal, a non-coherent light signal, and an infrared signal.

Processor 14 processes signals and signal reflections received by transceiver 12 (collectively referred to as sensor data, such as, for example, sensor data 29) to convert signals and signal reflections into meaningful digital data (e.g., digital data 6).

Processor 14 can be a digital signal processor configured to convert signals and signal reflections into digital data and deliver digital data to external components, such as, for example, communication link 33 (e.g., to a display device or another computer system), storage 37 (e.g., a magnetic disk, RAM, etc.), and contact closure 39.

Digital data 6 can include, for example, a sensor configuration, presence indications, vehicle detections, and traffic statistics. Traffic statistics can include: vehicle counts per lane; vehicle counts per direction; vehicle counts per approach; turning counts; average speeds per lane, direction, or approach; 85th percentile speeds per lane, direction, or approach; occupancy per lane, direction, or approach; etc.

Processor 14 can also be configured to control transceiver 12. For example, processor 14 can send signal activation command 5 to transceiver 12 when transceiver 12 is to generate a signal.

Transducer system 10 is configured to create areas (hereinafter referred to as "transducer views") over which a transmit signal is propagated and/or from which a signal and/or signal reflection is received. In some embodiments, transducer system 10 creates multiple transducer views by switching between multiple fixed beam antennas, each one steered to a different angle. In alternate embodiments, an electronically steerable antenna implemented using phase shifters is used to electronically steer the antenna beam to different angles thus achieving the different transducer views. In still other alternate embodiments, multiple transducer views are created using a single antenna that is connected to the transceiver 12 via a rotary joint. The antenna is rotated around an axis so that a different transducer view is available at each instant in time.

These several transducer views form an aggregate sensor view when combined. Aggregate sensor view means a view as observed by a sensor composed of a plurality of transducer views. As depicted in FIG. 1, transducer system 10 creates an aggregate sensor view including transducer views 28A-28G. A power level defining the edge of a transducer view can be configured based on the sensitivity of transceiver 12 and detection algorithms running on processor 14.

Figure 2:
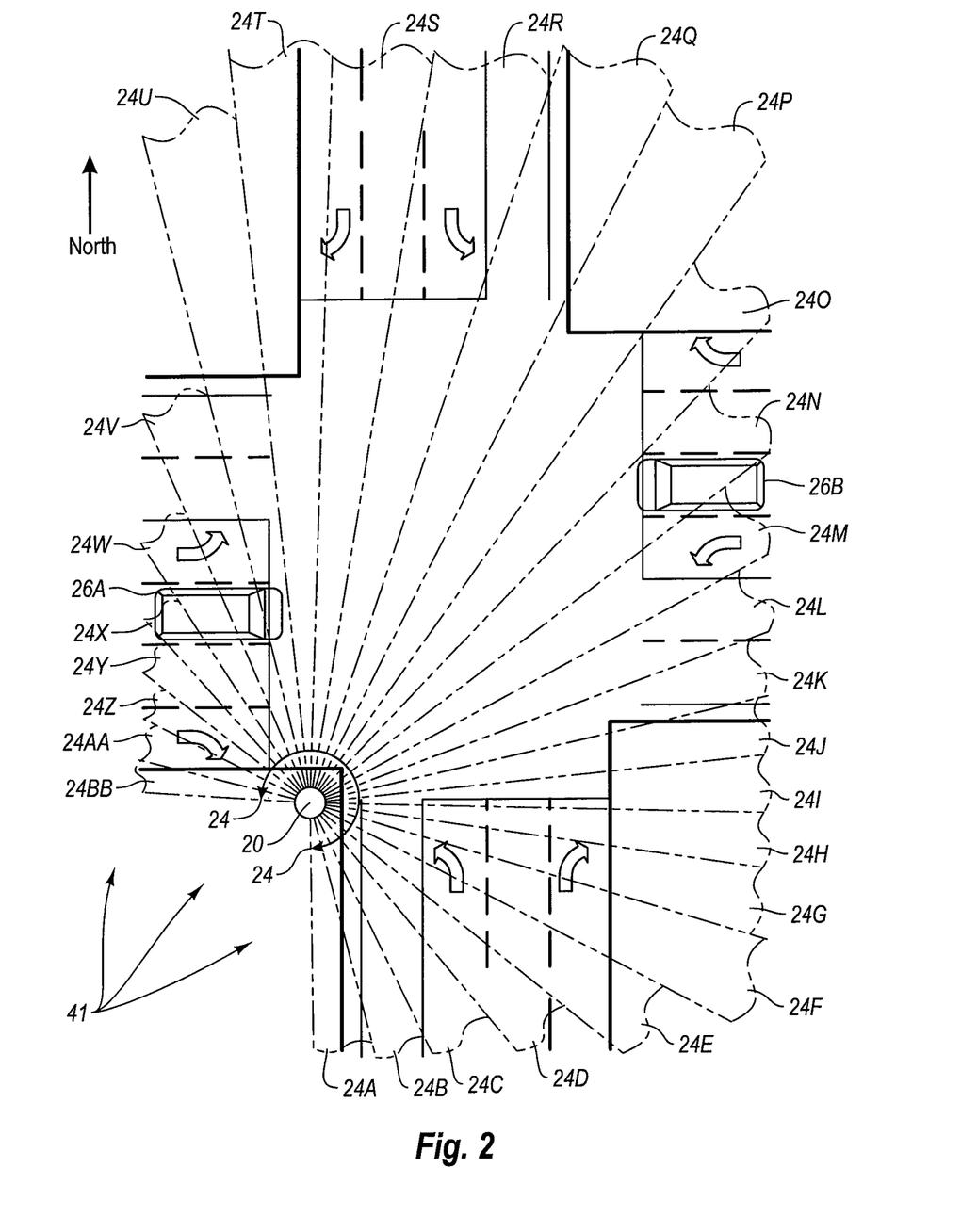
FIG. 2 depicts the example intersection vehicle traffic sensor of FIG. 1 in an intersection of roadways and depicts a further aggregate sensor view.

FIG. 2 depicts the intersection traffic sensor 20 of FIG. 1 in an intersection of roadways 41. Sensor 20 utilizes multiple transducer views 24A-24BB which, in combination, form the aggregate sensor view 24. For simplicity, the extent of the aggregate sensor view 24 is depicted as a rectangular. However, the extent of the aggregate sensor view 24 is actually defined by the limits of sensor 20's capabilities and is not necessarily rectangular.

Transducer system 10 (of FIG. 1) can be configured to switch (e.g., radar) signal transmission between transducer views 24A-24BB on (transmitting and receiving a signal) and off (not transmitting nor receiving a signal) in sequence. Transceiver 12 (of FIG. 1) can receive a reflected signal (e.g., a radar return) from a range in each of the transducer views 24A-24BB. The range is the distance between sensor 20 and the targets 26A and 26B. By using each of the transducer views 24A-24BB, sensor 20 can receive a radar return from multiple azimuth angles, which are measured in the horizontal plane.

Switched Antenna Architecture

Figure 3:
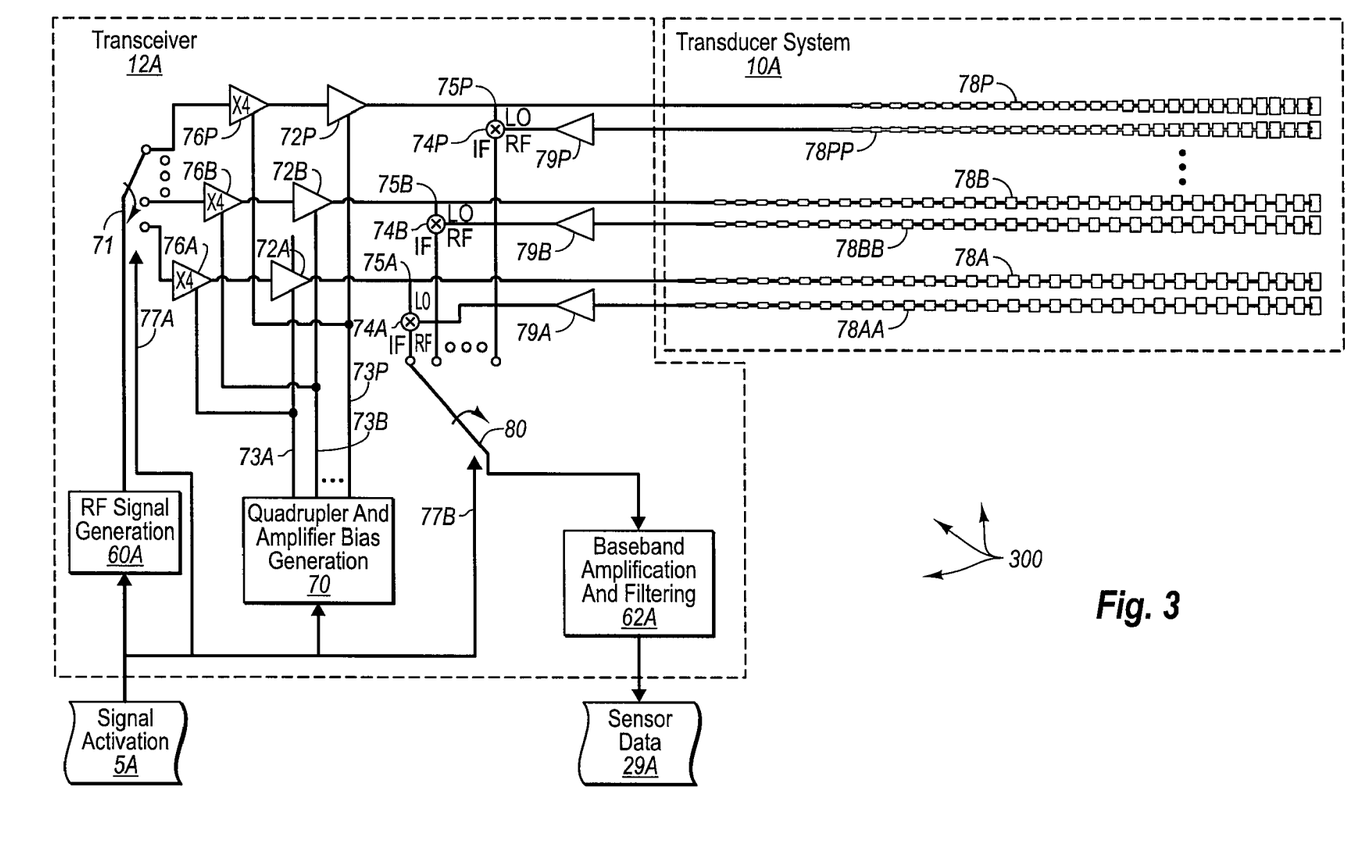
FIG. 3 depicts an example architecture for a switched antenna intersection traffic sensor.

FIG. 3 depicts an example architecture 300 for a switched antenna intersection traffic sensor. As depicted, architecture 300 includes transceiver 12A and transducer system 10A. Generally, transceiver 12A is configured to receive signal activations, interoperate with transducer system 10A, and send sensor data.

For example, transceiver 12A can receive signal activation 5A (e.g., from a processor). Signal activation 5A can be similar to signal activation 5 from FIG. 1. Signal activation 5A triggers the RF signal generation 60A. In one embodiment, the RF signal generation 60A includes direct digital synthesis and frequency up-conversion. The resulting signal is a 6 GHz to 6.0625 GHz FMCW chirp. This signal is then routed to one of sixteen quadruplers (e.g., quadruplers 76A-76P) via a 6 GHz switch (e.g., switch 71). A control line (e.g., control line 77A) controls the 6 GHz switch (e.g., switch 71). The effect of the quadruplers is to quadruple the frequency of the signal resulting in a 24 GHz to 24.25 GHz chirp.

The sixteen quadruplers can be switched on (quadrupling the frequency of the input signal) and off (not quadrupling the frequency of the input signal and providing isolation of the input signal from the output). The quadruplers are followed by power amplifiers (e.g., amplifiers 72A-72P). These sixteen amplifiers can also be switched on (amplifying) and off (not amplifying). By switching the quadruplers and the power amplifiers the isolation on the transmit signals can be improved and power consumption is reduced by only powering the devices as needed.

Quadrupler and amplifier biasing (e.g., biasing 73A-73P) is used to switch the quadruplers and amplifiers on and off. The biasing is created by quadrupler and amplifier bias generation (e.g., quadrupler and amplifier bias generation 70). The quadrupler and amplifier bias generation is controlled by the signal activation (e.g., signal activation 5A). Thus, the signal activation can dictate which of the quadrupler-amplifier pairs are switched on. The quadrupler-amplifier pair that is connected to the RF signal via the 6 GHz switch will be switched on. The others will be switched off.

Transmission line couplers (e.g., couplers 75A-75P) are used to split the signal from the amplifiers (e.g., amplifiers 72A-72P) so that a portion of the signal is delivered to the LO port of the mixers (e.g., mixers 74A-74P) and a portion is delivered to the transmit antennas (e.g. antennas 78A-78P) in transducers system 10A.

Embodiments of the present invention can include both directional transmit antennas and directional receive antennas. When directional transmit antennas are used, a plurality of transmit antennas may be necessary to achieve multiple transducer views. Using a plurality of directional transmit antennas (e.g. antennas 78A-78P) decreases the sidelobe level in the two-way antenna patterns and narrows the main bean in the two-way antenna patterns. For example, a directional antenna can have a mainlobe steered to a specific direction and will have sidelobes in other directions. In some antennas, these sidelobes will receive or transmit power at an approximate level of −20 dB from the mainlobe. When two identical directional antennas are used as a transmit and receive pair, then the combined sidelobe approximate level is −40 dB. This same approximate −40 dB sidelobe level can be achieved if one antenna is used to both receive and transmit. Furthermore, the same effect that causes the reduced sidelobe level in the two-way antenna pattern also causes a narrowing of the mainlobe. Thus, when multiple directional transmit antennas are used, the beamwidth of the mainlobe is narrower than if a single broad transmit antenna is used.

The signal from the receive antennas (e.g., antennas 78AA-78PP) in transducer system 10A is amplified by a low noise amplifier (e.g., amplifiers 79A-79P). The amplified signal is delivered to the RF port of the mixers (e.g., mixers 74A-74P). The intermediate frequency (IF) signal, which in the case of FMCW demodulation is a baseband signal, is produced at the IF mixer ports. The IF signals from each of the mixers (e.g., mixers 74A-74P) are fed into a baseband switch (e.g., baseband switch 80).

The baseband switch control (e.g., switch control 77B) is synchronized with the quadrupler and amplifier biases and the 6 GHz switch control (e.g., switch control 77A) so that the appropriate baseband is connected to baseband amplification and filtering (e.g., baseband amplification and filtering 62A). After the baseband signal is conditioned by the baseband amplification and filtering, the signal is considered sensor data (e.g., sensor data 29A). This sensor data is digitized and converted into useful information by a processor (e.g., processor 14).

In one embodiment, the transmit and receive antennas (e.g., antennas 78A-78P and 78AA-78PP) in transducer system 10A are traveling wave series fed microstrip patch antennas that are terminated by a matched microstrip patch. Traveling wave series fed microstrip patch antennas create a fan shaped antenna beam. This type of antenna is a printed microwave antenna that is manufactured using printed circuit board techniques. The antennas can be oriented so that the antenna beam is narrow in the azimuth (or horizontal) plane and wide in the elevation (or vertical) plane. The steer angle of the beam, which is measured in the azimuth plane, may be dictated by the phasing between the antenna elements. The spacing of the elements at least in part controls this phasing. For example, antenna 78A can be designed so that its beam is steered to near boresight (perpendicular). Antenna 78P, however, can be designed so that its beam is steered to approximately 42° off of boresight. In this way sixteen (or some other appropriate number of) antennas can be designed with feed points on opposite sides so that the sixteen (or other appropriate number of) antenna beams cover a 90° area.

One embodiment of the traffic sensor will have an aggregate sensor view of 270°. To achieve this aggregate sensor view, three transceiver-transducer system pairs such as the ones depicted in FIG. 3 are utilized. Each transceiver-transducer system can be oriented at 90° to the adjacent pair, resulting in an aggregate sensor view of 270°.

In another embodiment, the traffic sensor will have an aggregate sensor view of 90°. In this embodiment, multiple traffic sensors will be used together to provide the needed detections. For example, three sensors may be mounted on the same pole and oriented 90° from the adjacent sensor(s). In this orientation the aggregate sensor views of each of the sensors will then cover a 270° area.

The processor or processors that control the three transceiver-transducer system pairs will create three signal activation signals (e.g., similar to signal activation 5A) and will receive three sensor data signals (e.g., similar to sensor data 29A).

In other embodiments of the switched antenna architecture the same antenna is used for transmitting and for receiving. In these embodiments, a directional coupler or circulator can be used to separate the transmit signal from the receive signal.

Alternately, a two port mixer can be used in which the local oscillator ("LO") signal and the radio frequency ("RF") signals are injected into the same mixer port. The intermediate frequency ("IF") signal, which in the case of FMCW demodulation is a baseband signal, is produced at the other mixer port.

Electronically Steered Antenna Architecture

Figure 4:
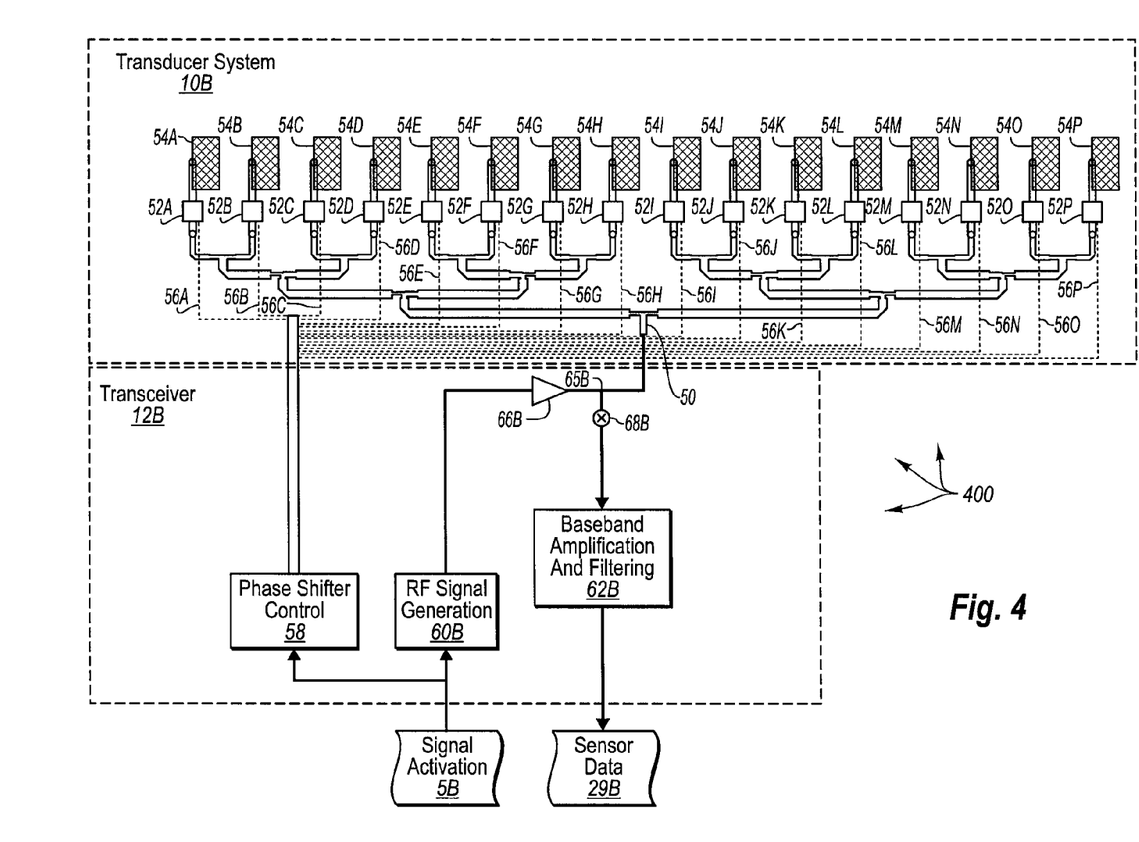
FIG. 4 depicts an example architecture for an electronically steered antenna intersection traffic sensor.

FIG. 4 depicts an example architecture 400 for an electronically steered antenna intersection traffic sensor. As depicted, architecture 400 includes transceiver 12B and transducer system 10B. Generally, transceiver 12B is configured to receive signal activations, interoperate with transducer system 10B, and send sensor data.

For example, transceiver 12B can receive signal activation 5B (e.g., from a processor). Signal activation 5B can be similar to signal activation 5 from FIG. 1. Signal activation 5B triggers the RF signal generation 60B. In one embodiment, the RF signal generation 60B consists of direct digital synthesis, a frequency up-conversion mixing stage, and a frequency multiplication stage. The resulting signal is a 24 GHz to 24.25 GHz FMCW chirp. This signal is amplified (as shown by example amplifier 66B). A transmission line matched tee (e.g., tee 65B) is used to split the signal so that a portion of the signal is delivered to the mixer (e.g., mixer 68B) and a portion is delivered to the transducer system 10B. In this embodiment, the matched port of the matched tee is connected to the two port mixer (e.g., mixer 68B). In alternate embodiments, the transmit and receive signals are separated using a directional coupler or a circulator and a standard three port mixer can be used. In still other embodiments, separate transmit and receive antennas are used.

Amplification and filtering can be performed on the baseband signal (as shown by the baseband amplification and filtering block 62B) to generate the sensor data (e.g., sensor data 29B). The sensor data can then be digitized and converted into useful information by a processor (e.g., processor 14).

One embodiment of the transducer system 10B includes a corporate fed microstrip patch array antenna. The corporate feed (e.g., corporate feed 50) is designed on a strip line layer to prevent undesired radiation. The corporate feed serves to divide the power between the radiating patches (e.g., microstrip patches 54A-54P) such that an amplitude window across the array is created. This amplitude window serves to reduce the antenna sidelobes. The strip line layer corporate feed (e.g., corporate feed 50) transitions to a coplanar transmission line on the outer layer with a pad to accommodate a surface mount phase shifter (e.g., phase shifters 52A-52P).

Surface mounted ferroelectric thin film passive phase shifters (e.g., mounted using a "flip chip" solder reflow method) can be utilized. Ferroelectric thin film passive phase shifters can be used to alter the phase of the signal that is radiated by each individual radiating element (e.g., microstrip patches 54A-54P) or to alter the phase of the signal that is received by each individual radiating element. A phase shifter control (e.g., phase shifter control 58) generates DC bias voltages that are transmitted by DC bias lines (e.g., DC bias lines 56A-56P) and control the phase shifters (e.g., phase shifters 52A-52P). This phase shifter control can generate the DC bias necessary for each phase shifter so that the beam that is generated from the antenna array is steered in the necessary direction.

In alternate embodiments, phase shifters based on time delays can be used. For example, inside the phase shifter the signal path can be switched between various delay line lengths. Each different delay line length will provide a different time delay and provide a different phase shift.

A calibration process can be utilized to eliminate phase errors introduced by variation between phase shifters and/or variation with temperature. This calibration process may be performed using an artificial tone that is injected into the antenna or using a bright target in the view of the sensor.

The radiating elements (e.g., microstrip patches 54A-54P) of transducer system 10B are located on the opposite side of the printed circuit board from the phase shifters (e.g., phase shifters 52A-52P). Thus, unwanted radiation from the phase shifters can be mitigated.

An electronically steered antenna such as the one described above can be reasonably steered to approximately +45°.

A preferred embodiment of the traffic sensor can have an aggregate sensor view of 270°. To achieve this aggregate sensor view, three transceiver-transducer system pairs such as the ones depicted in FIG. 4 can be utilized. Each transceiver-transducer system will be oriented at 90° to the adjacent pair. In this way, an aggregate sensor view of 270° can be achieved.

In another embodiment, the traffic sensor will have an aggregate sensor view of 90°. In this embodiment, multiple traffic sensors will be used together to provide the needed detections. For example, three sensors may be mounted on the same pole and oriented 90° from the adjacent sensor(s). In this orientation the aggregate sensor views of each of the sensors will then cover a 270° area.

The processor that controls the three transceiver-transducer system pairs will create three signal activation signals (e.g., signal activation 5B) and will receive three sensor data signals (e.g., sensor data 29B).

Mechanically Steered Antenna Architecture

Figure 5:
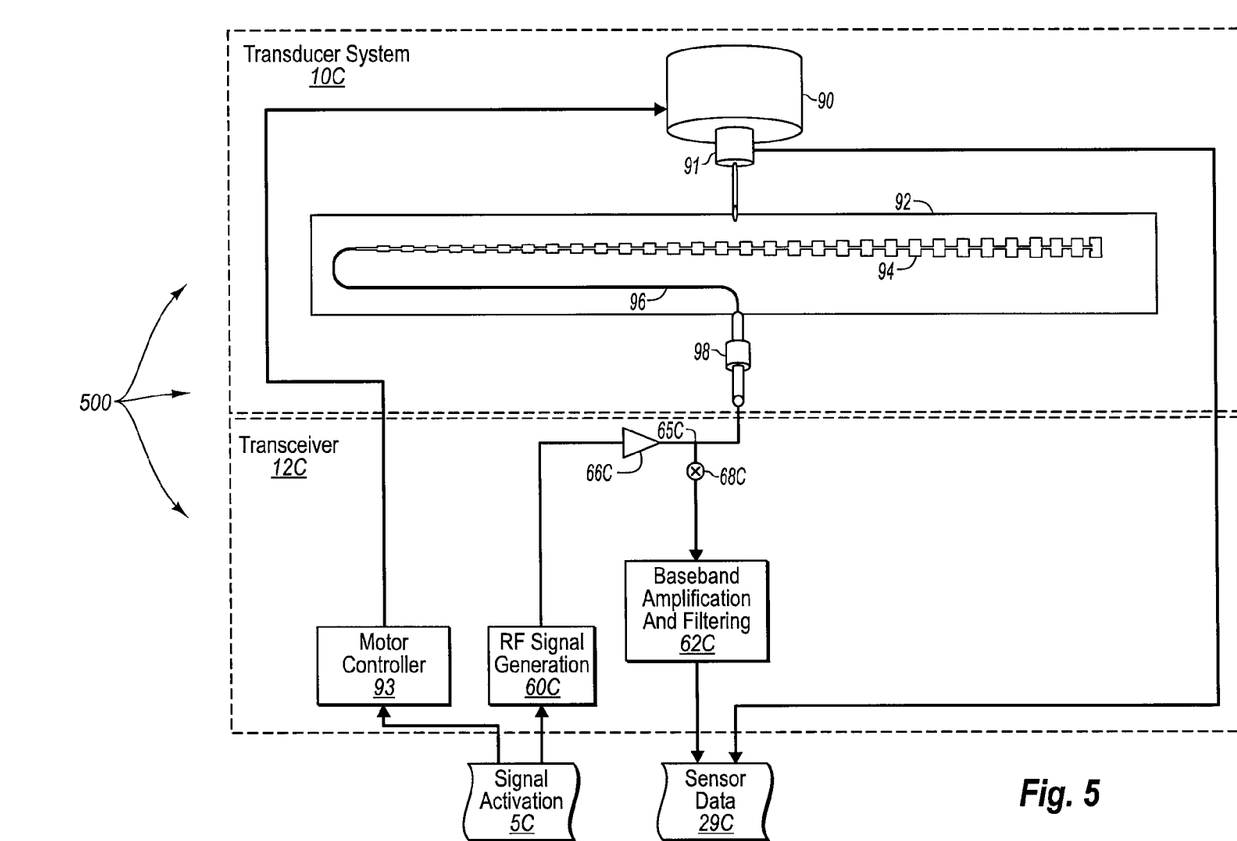
FIG. 5 depicts an example architecture for a mechanically steered intersection traffic sensor.

FIG. 5 depicts an example architecture 500 for a mechanically steered antenna intersection traffic sensor. As depicted, architecture 500 includes transceiver 12C and transducer system 10C. Generally, transceiver 12C is configured to receive signal activations, interoperate with transducer system 10C, and send sensor data For example, transceiver 12C can receive signal activation 5C (e.g., from a processor). Signal activation 5C can be similar to signal activation 5 from FIG. 1. Signal activation 5C triggers the RF signal generation 60C. In one embodiment, the RF signal generation 60C consists of direct digital synthesis, a frequency up-conversion mixing stage, and a frequency multiplication stage. The resulting signal is a 24 GHz to 24.25 GHz FMCW chirp. This signal is amplified (as shown by example amplifier 66C). A transmission line matched tee (e.g., tee 65C) is used to split the signal so that a portion of the signal is delivered to the mixer (e.g., mixer 68C) and a portion is delivered to the transducer system (e.g. transducer system 10C). In this embodiment, the matched port of the matched tee is connected to the two port mixer (e.g., mixer 68C).

In alternate embodiments, the transmit and receive signals are separated using a directional coupler or a circulator and a standard three port mixer can be used. In still other embodiments, separate transmit and receive antennas are used.

Amplification and filtering are performed on the baseband signal (as shown by the baseband amplification and filtering block 62C) to generate the sensor data (e.g., sensor data 29C) that can then be digitized and converted into useful information by a processor (e.g., processor 14).

Embodiments of the transducer system include a series fed microstrip patch array that is terminated in a matched microstrip patch (e.g., antenna 94). The array is phased so that the beam of the antenna is steered near boresight. The antenna can be printed onto a circuit board (e.g., circuit board 92) that spins by means of a magnetic bearing motor (e.g., motor 90). A magnetic bearing motor uses a magnetic field to suspend the motor shaft without physical contact. This type of motor is used in preferred embodiments in order to avoid the use of contact rotary bearings that would wear out and cause failure points. The motor is controlled by a control signal generated by a motor controller (e.g., motor controller 93). The motor controller responds to the signal activation signal (e.g., signal 5C).

In alternate embodiments, a reflector or dielectric lens is rotated. In these embodiments, a radiating source illuminates the reflector or dielectric lens, which becomes a rotating antenna.

A rotary encoder (e.g., rotary encoder 91) can be included on the motor so that the angle information at each instant in time is available in the sensor data (e.g. sensor data 29C). In one embodiment, a contactless rotary joint (e.g., rotary joint 98) is used to provide signal connectivity between the stationary transceiver 12C and the spinning antenna board 92. A stripline transmission line 96 transmits the RF signal from rotary joint to the antenna 94. The use of a rotary joint allows for multiple 360° revolutions of the antenna (e.g., antenna 94).

In operation, the motor spins at a constant rate while sensor data is continually created. Each time an FMCW chirp is transmitted and received the pointing angle of the antenna is included in the sensor data. In this way, a near 360° aggregate sensor view can be created.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired secured by United States Letters Patent is:

1. A traffic sensor for monitoring a roadway intersection, the traffic sensor comprising:
    an electronically steered transducer for creating a plurality of transducer views of the roadway intersection, the electronically steered transducer including:
        a plurality of radiating transducer elements;
        a plurality of corresponding phase shifters for controlling the phase of a signal that is transmitted through the plurality of radiating transducer elements;
    a transceiver system configured to:
        control the operation of the plurality of corresponding phase shifters;
        create a signal that is transmitted through the electronically steered transducer; and
        receive a signal or signal reflection through a receive transducer; and
    wherein the electronically steered transducer and the transceiver system interoperate to generate an aggregate sensor view; and
    an antenna feed structure for creating an amplitude window across the plurality of radiating transducer elements, the amplitude window reducing sidelobes of at least one of the transducer views in the plurality of transducer views.

2. The traffic sensor as recited in claim 1, wherein the electronically steered transducer comprises a printed microwave array antenna having a plurality of radiating elements.

3. The traffic sensor as recited in claim 1, wherein the electronically steered transducer comprises a plurality of ferroelectric thin film passive phase shifters, each ferroelectric thin film passive phase shifter for altering the phase of a signal that is transmitted through a corresponding radiating element.

4. The traffic sensor as recited in claim 1, wherein the transceiver system includes:
    an RF signal generator that upon signal activation generates an RF signal.

5. The traffic sensor as recited in claim 1, wherein the transceiver system includes:
    a mixer configured to:
        receive a local oscillator signal and a radio frequency signal as input; and
        produce an intermediate frequency representative of sensor data signal as output.

6. The traffic sensor recited in claim 1, wherein the aggregate sensor view of the traffic sensor is 60 degrees or greater.

7. The traffic sensor as recited in claim 6, wherein the traffic sensor comprises three electronically steered transducers, each electronically steered transducer steerable across a sensor view of approximately 60 degrees or greater.

8. The traffic sensor recited in claim 1, wherein the transceiver system is further configured to:
    receive a signal activation from a processor;
    send sensor data to the processor.

9. The traffic sensor as recited in claim 1, wherein the transceiver system being configured to receive a signal or signal reflection through a receive transducer comprises the transceiver system being configured to receive a signal or signal reflection through the electronically steered transducer.

10. The traffic sensor as recited in claim 1, wherein the transceiver system being configured to receive a signal or signal reflection through a receive transducer comprises the transceiver system being configured to receive a signal or signal reflection through an additional transducer of the traffic sensor that is different than the electronically steered transducer.

11. The traffic sensor as recited in claim 1, wherein the additional transducer is a second electronically steered transducer.

12. The traffic sensor as recited in claim 1, wherein the electronically steered transducer and the transceiver system interoperating to generate an aggregate sensor view comprises the electronically steered transducer and the transceiver system interoperating to generate an aggregate sensor view that includes a plurality of transducer views of two or more approaches to the roadway intersection.

13. A traffic sensor for monitoring a roadway intersection, the traffic sensor comprising:
    an electronically steered transducer for creating a plurality of transducer views of the roadway intersection, the electronically steered transducer including:
        a plurality of radiating transducer elements;
        a plurality of corresponding phase shifters for controlling the phase of a signal or signal reflection that is received through the plurality of radiating transducer elements;
    a transceiver system configured to:
        control the operation of the plurality of corresponding phase shifters;
        create a signal that is transmitted through a transmit transducer; and
        receive a signal or signal reflection through the electronically steered transducer; and wherein the electronically steered transducer and the transceiver system interoperate to generate an aggregate sensor view; and an antenna feed structure for creating an amplitude window across the plurality of radiating transducer elements, the amplitude window reducing sidelobes of at least one of the transducer views in the plurality of transducer views.

14. The traffic sensor as recited in claim 13, wherein the transceiver system being configured to create a signal that is transmitted through a transmit transducer comprises the transceiver system being configured to create a signal that is transmitted through the electronically steered transducer.

15. The traffic sensor as recited in claim 13, wherein the transceiver system being configured to create a signal that is transmitted through a transmit transducer comprises the transceiver system being configured to create a signal that is transmitted through an additional transducer of the traffic sensor that is different than the electronically steered transducer.

16. The traffic sensor as recited in claim 15, wherein the additional transducer is a second electronically steered transducer.

17. The traffic sensor as recited in claim 13, wherein electronically steered transducer and the transceiver system interoperating to generate an aggregate sensor view comprises the electronically steered transducer and the transceiver system interoperating to generate an aggregate sensor view that includes a plurality of transducer views of two or more approaches to the roadway intersection.

18. The traffic sensor as recited in claim 1, further comprising a calibration component, the calibration component configured to reduce phase errors in the signal that is transmitted though the plurality of radiating transducer elements.

19. The traffic sensor as recited in claim 1, wherein the electronically steered transducer is steerable between multiple different directional approaches to the roadway intersection such that the range of the plurality of transducer views spans the multiple different directional approaches to the roadway intersection; and wherein the electronically steered transducer and the transceiver system interoperate to generate an aggregate sensor view of the multiple different approaches to the intersection.

20. The traffic sensor of claim 19, wherein the electronically steered transducer is steerable between the multiple different directional approaches to the roadway intersection.

21. The traffic sensor of claim 6 or 19, wherein the aggregate sensor view of the traffic sensor is approximately 270 degrees.

22. The traffic sensor of claim 19, wherein the electronically steered transducer and the transceiver system interoperating to generate an aggregate sensor view comprises the electronically steered transducer and the transceiver system interoperating to combine at least one transducer view from a first directional approach to the intersection and at least one transducer view from a second different directional approach to the intersection into the aggregate sensor view.

23. The traffic sensor as recited in claim 13, further comprising a calibration component, the calibration component configured to reduce phase errors in the signal or signal reflection that is received through the plurality of radiating transducer elements.

24. The traffic sensor as recited in claim 13, wherein the electronically steered transducer is steerable between multiple different directional approaches to the roadway intersection such that the range of the plurality of transducer views spans the multiple different directional approaches to the roadway intersection; and wherein the electronically steered transducer and the transceiver system interoperate to generate an aggregate sensor view of the multiple different approaches to the intersection.

25. The traffic sensor of claim 24, wherein the electronically steered transducer is steerable between all the different directional approaches to the roadway intersection.

26. The traffic sensor of claim 13, wherein the wherein the aggregate sensor view of the traffic sensor is 60 degrees or greater.

27. The traffic sensor of claim 25 or 26, wherein the aggregate sensor view of the traffic sensor is approximately 270 degrees.

28. The traffic sensor of claim 13, wherein the electronically steered transducer and the transceiver system interoperate to generate an aggregate sensor view comprises the electronically steered transducer and the transceiver system interoperating to combine at least one transducer view from a first directional approach to the intersection and at least one transducer view from a second different directional approach to the intersection into the aggregate sensor view.

* * * * *